(12) United States Patent
Ishikawa

(10) Patent No.: US 7,911,525 B2
(45) Date of Patent: Mar. 22, 2011

(54) HYBRID AUTO-FOCUS OPERATION WHICH DOES NOT PERFORM DISTANCE DETECTION FOCUSING IF THE LENS IS AT A PREDETERMINED CLOSEST DISTANCE SIDE

(75) Inventor: Yoshikazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 11/844,159

(22) Filed: Aug. 23, 2007

(65) Prior Publication Data

US 2008/0211957 A1 Sep. 4, 2008

(30) Foreign Application Priority Data

Aug. 29, 2006 (JP) .................................. 2006-232350

(51) Int. Cl.
*G03B 13/00* (2006.01)
*H04N 5/232* (2006.01)
(52) U.S. Cl. ........ 348/345; 348/347; 348/348; 348/350; 348/353
(58) Field of Classification Search .................. 348/345, 348/347–350, 353, 354, 356
See application file for complete search history.

(56) References Cited

U.S. PATENT DOCUMENTS

| | | | | |
|---|---|---|---|---|
| 6,430,368 B1 * | 8/2002 | Hata | | 396/79 |
| 6,498,621 B1 * | 12/2002 | Ikeda et al. | | 348/222.1 |
| 7,365,790 B2 * | 4/2008 | Shinohara | | 348/345 |
| 7,423,685 B2 * | 9/2008 | Morimoto | | 348/347 |
| 7,499,097 B2 * | 3/2009 | Onozawa | | 348/348 |
| 2002/0135693 A1 * | 9/2002 | Ohkawara et al. | | 348/347 |
| 2003/0081137 A1 * | 5/2003 | Yamazaki | | 348/354 |
| 2004/0037546 A1 * | 2/2004 | Nonaka | | 396/121 |
| 2008/0025713 A1 * | 1/2008 | Yasuda | | 396/104 |

FOREIGN PATENT DOCUMENTS

JP 06-090395 A 3/1994
JP 2002-258147 A 9/2002

* cited by examiner

*Primary Examiner* — Sinh Tran
*Assistant Examiner* — Daniel M Pasiewicz
(74) *Attorney, Agent, or Firm* — Canon USA, Inc. IP Division

(57) ABSTRACT

When the present position of a focus lens is on the closest distance side with respect to a predetermined position, the focus lens is driven and controlled using a TV-AF method without using the output result of an external ranging unit, and thereby a malfunction of an AF control due to parallax between an image pickup optical system and an external sensor is prevented.

8 Claims, 8 Drawing Sheets

HYBRID AUTO-FOCUS OPERATION WHICH DOES NOT PERFORM DISTANCE DETECTION FOCUSING IF THE LENS IS AT A PREDETERMINED CLOSEST DISTANCE SIDE

BACKGROUND OF THE INVENTION

1. Field of the Invention

The present invention relates to a focusing technique.

2. Description of the Related Art

There are various automatic focusing (hereinafter also referred to as AF) control methods for image pickup apparatuses such as video cameras. In a so-called TV-AF method, a predetermined high frequency component (contrast component) of an image signal is extracted, and a focusing lens is controlled so that an AF signal corresponding to the sharpness of the image is largest. In another method, information corresponding to the distance to the object is obtained by measuring the phase difference of the object or by triangulation. A combination of these methods (hybrid AF control method) is proposed in Japanese Patent Laid-Open No. 2002-258147.

The hybrid AF control method is a combination of the TV-AF method and an internal measurement method or an external measurement method. In the internal measurement method, light incident on an image pickup optical system is split and input into a sensor that measures the phase difference, and the amount of deviation between the focal position and the in-focus position is measured (the first embodiment of Japanese Patent Laid-Open No. 2002-258147). In the external measurement method, a sensor that measures the phase difference is provided separately from an image pickup optical system (the third embodiment of Japanese Patent Laid-Open No. 2002-258147).

In the internal measurement method, the same object image as the object image picked up in the image pickup optical system is input into the sensor that measures the phase difference. Therefore, the sensor can surely capture the object. However, since a light splitting mechanism and the sensor are placed in the lens barrel, the size of the lens barrel is liable to be large and therefore the size of the image pickup apparatus main body is liable to be large.

In the external measurement method, since the sensor that measures the phase difference is disposed separately from the image pickup optical system, there is a lot of flexibility of layout. Therefore, this method is advantageous to the size reduction of the apparatus. However, a deviation occurs between the distance to the main object to be photographed and the distance to the object measured by the sensor that measures the phase difference. Focusing can fail or take a long time. To solve this problem, for example, Japanese Patent Laid-Open No. 6-90395 proposes a hybrid AF control method in which AF methods are switched based on the comparison between the distance measured by a ranging sensor and a predetermined distance.

However, in the above-described external measurement method, since the distance sensor is disposed independently from the image pickup optical system, a deviation occurs between the optical axis of the image pickup optical system and the measurement axis of the distance sensor, that is to say, a parallax occurs. FIG. 2 shows the photographing range and the measuring range of an external sensor that measures the phase difference in the case where a hand is held in front of the image pickup optical system of an image pickup apparatus. In the case where a hand is held in front of the image pickup optical system, as shown in FIG. 2, the object photographed through the image pickup optical system (the hand) is different from the object A captured by the external sensor. In this case, if the focusing operation is started based on the measurement result of the external sensor, a malfunction of the hybrid AF control is induced. For example, focusing on the object of the image pickup optical system fails or takes a long time.

SUMMARY OF THE INVENTION

An aspect of the present invention is directed to preventing a malfunction of an AF control due to parallax between an image pickup optical system and an external sensor.

According to an aspect of the present invention, there is provided a focusing apparatus including a first detecting unit configured to output an electric signal from an optical image formed through an image pickup optical system including a focus lens and detect a focus signal showing the sharpness of the optical image from the output electric signal, a second detecting unit configured to detect the in-focus position with an optical system provided separately from the image pickup optical system, and a control unit configured to drive and control the focus lens based on the detection result from the first and second detecting units. The control unit drives and controls the focus lens using the first detecting unit without using the second detecting unit when the present position of the focus lens is on the closest distance side with respect to a predetermined position.

According to another aspect of the present invention, there is provided a method for controlling a focusing apparatus which includes a first detecting unit configured to output an electric signal from an optical image formed through an image pickup optical system including a focus lens and detect a focus signal showing the sharpness of the optical image from the output electric signal, a second detecting unit configured to detect the in-focus position with an optical system provided separately from the image pickup optical system, and a control unit configured to drive and control the focus lens based on the detection result from the first and second detecting units. The method includes the step of driving and controlling the focus lens using the first detecting unit without using the second detecting unit when the present position of the focus lens is on the closest distance side with respect to a predetermined position.

Further features and aspects of the present invention will become apparent from the following description of exemplary embodiments with reference to the attached drawings.

DESCRIPTION OF THE EMBODIMENTS

Various embodiments, features and aspects of the present invention will now herein be described with reference to attached drawings.

It is noted that the scope of the present invention is not intended to be limited by each embodiment described below.

Figure 1:
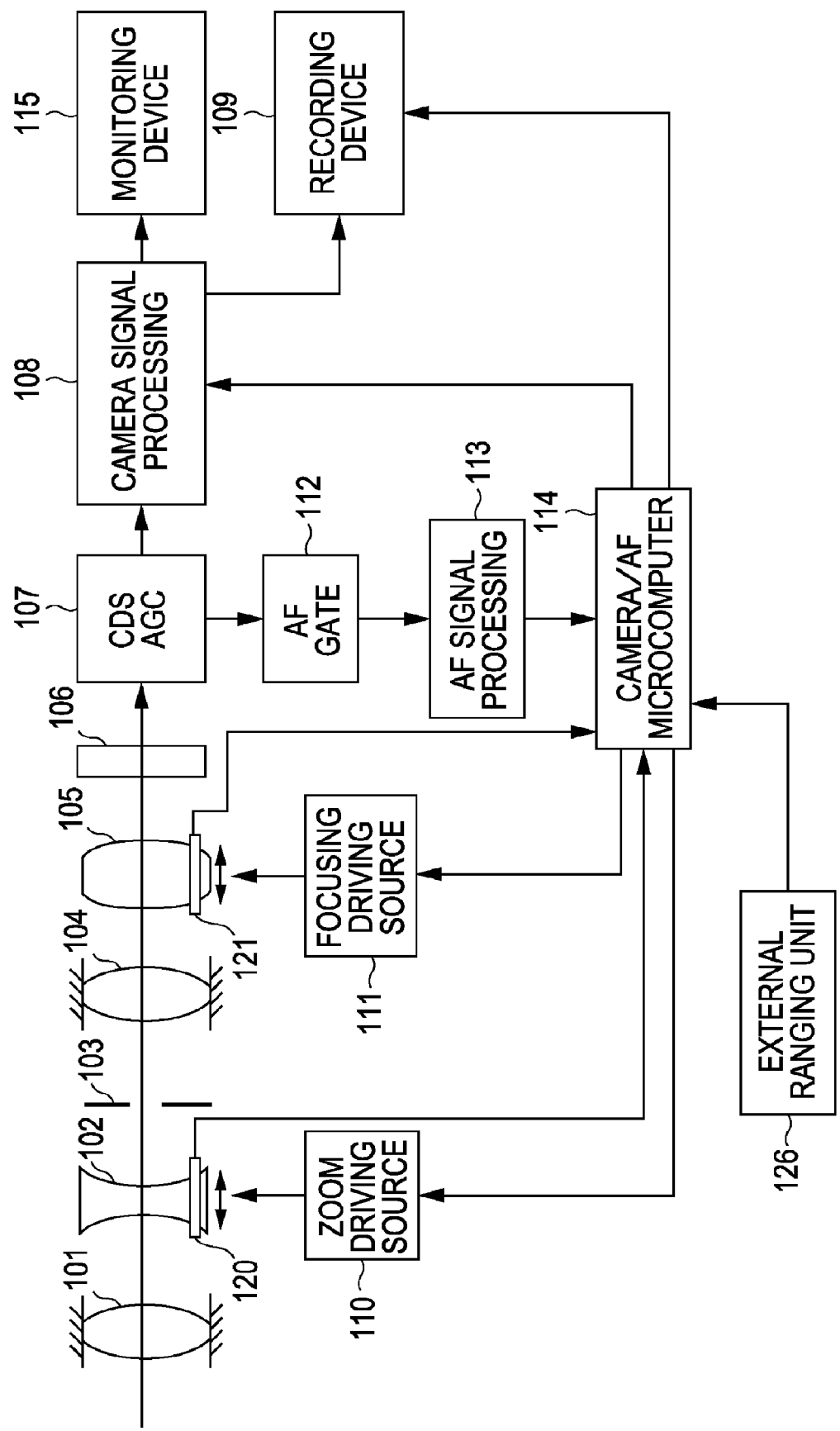
FIG. 1 shows an example structure of an image pickup apparatus according to an embodiment.
Figure 2:
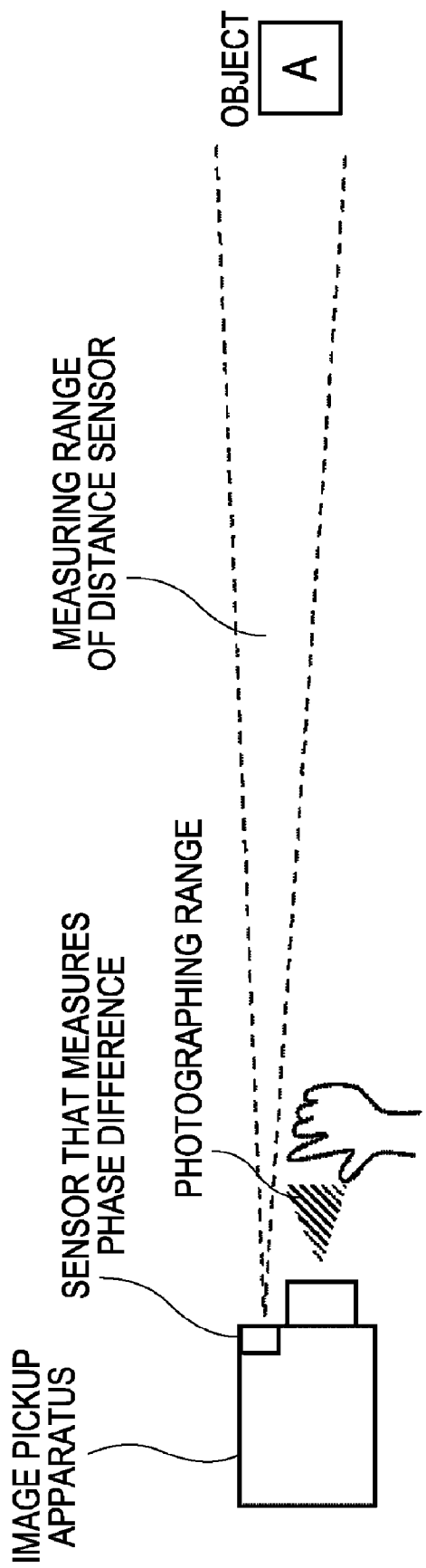
FIG. 2 shows the parallax between the optical axis of an image pickup optical system and the measurement axis of a distance sensor.

FIG. 1 shows an example structure of an image pickup apparatus having characteristics of the present invention. Reference numeral 101 denotes a first fixed lens unit. Reference numeral 102 denotes a zoom lens unit that performs zooming (hereinafter referred to as zoom lens). Reference numeral 103 denotes a stop. Reference numeral 104 denotes a second fixed lens unit. Reference numeral 105 denotes a lens unit that has both a focusing function and a compensation function to compensate for movement of the focal plane due to zooming (hereinafter referred to as focus lens). The zoom lens 102 and the focus lens 105 can be moved in the optical axis direction (the horizontal direction in the figure) with a zoom driving source 110 and a focusing driving source 111, respectively.

In such an inner focus type lens system, even if the object distance is equal, the position of the focus lens 105 for focusing on an image pickup plane 106 varies depending on the focal length. The reason is that the focus lens 105 has both a function as a compensator lens and a focusing function.

Figure 8:
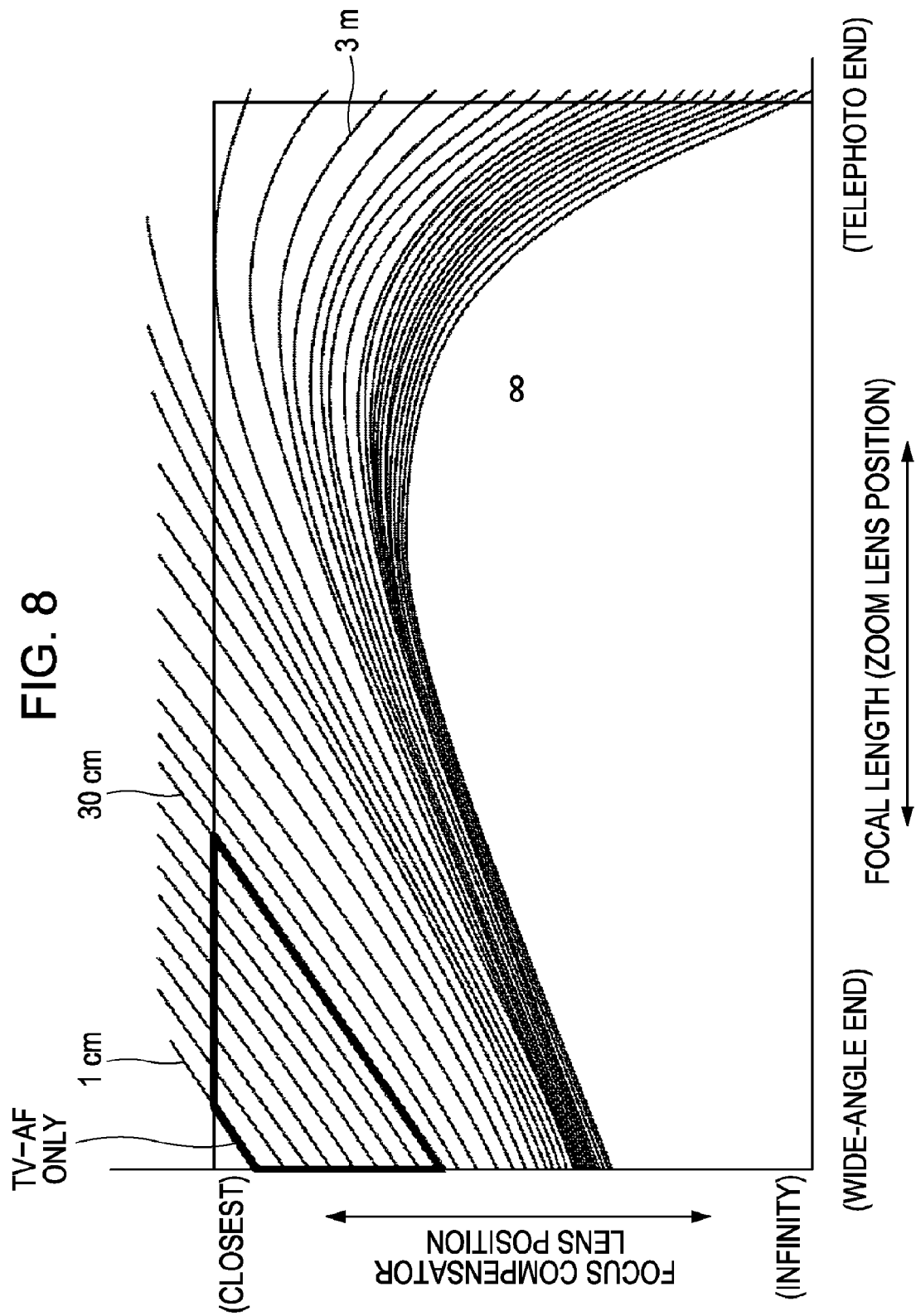
FIG. 8 shows cam locus data.

When the focal length is changed, that is to say, when the zoom lens 102 is driven, the position of the focus lens 105 for focusing at a given object distance is expressed by curves shown in FIG. 8. In FIG. 8, the lowermost curve corresponds to the position for focusing on an object at infinity. The uppermost curve corresponds to the position for focusing on an object closest to the image pickup plane.

When an image of an object at a given distance is picked up, zooming can be performed in an in-focus state by driving the focus lens 105 according to the corresponding curved locus shown in FIG. 8 (hereinafter also referred to as cam locus). In an image pickup apparatus having an inner focus type lens system, the cam locus information shown in FIG. 8 is stored, for example, in a below-described microcomputer 114 in some form (loci themselves or functions of lens position). The necessary cam locus is selectable, for example, by index number. Based on the locus information, the focus lens 105 is driven relative to the drive of the zoom lens 102.

The incident light from the object, passing through the lens units 101 to 105, forms an image on an image pickup element 106. The image pickup element 106 is a photoelectric conversion element such as a CCD sensor or a CMOS sensor, and converts an object image into an electric signal. The electric signal is read out and amplified by a CDS/AGS circuit 107, and is input into a camera signal processing circuit 108. The camera signal processing circuit 108 performs a predetermined image signal processing, and converts the input signal into a signal for a recording device 109 and a monitoring device 115. The recording device 109 records the object image on a recording medium (for example, a magnetic tape, an optical disk, or a semiconductor memory). The monitoring device 115 displays the object image on an electric view finder or a liquid crystal panel.

Figure 6:
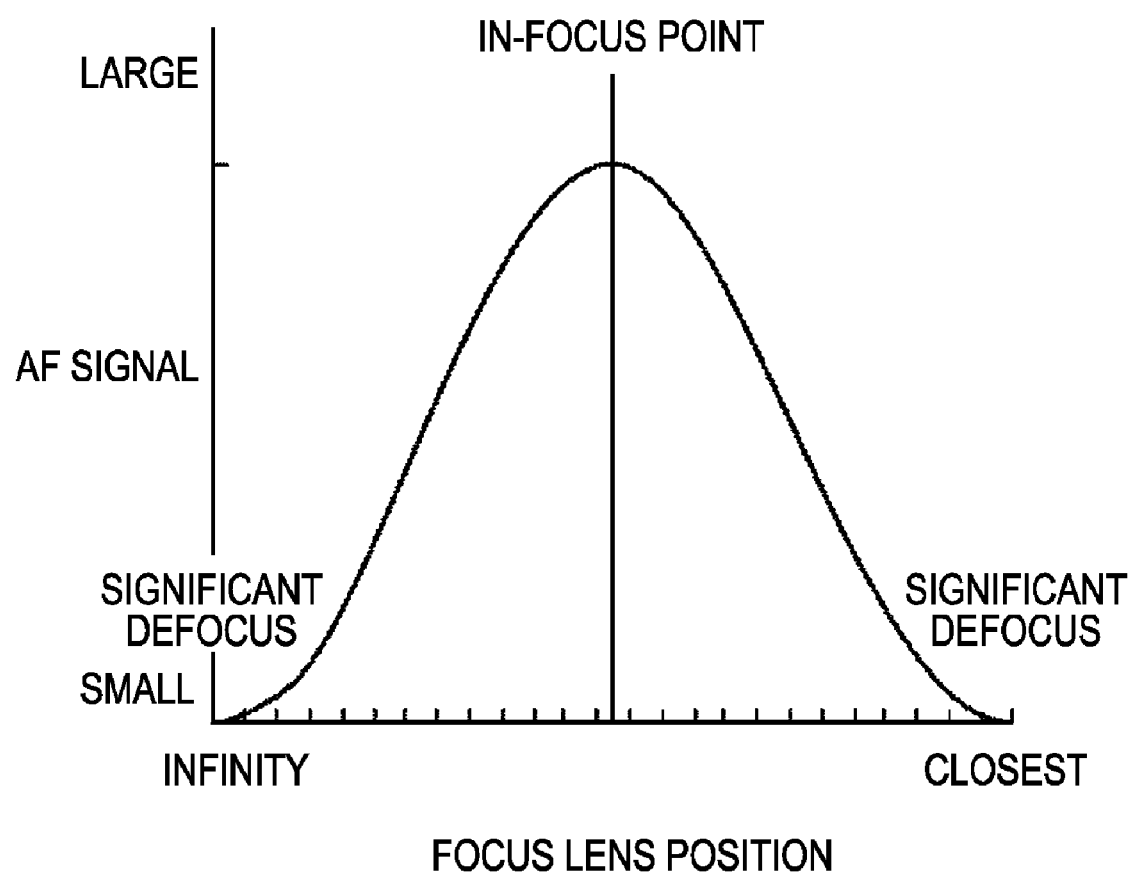
FIG. 6 shows the principle of automatic focusing in a TV-AF method.

The output from the CDS/AGC circuit 107 is also input into an AF gate 112. From the image signals of the whole screen, signals of a screen range used for focus control are selected. Any screen range can be set, and a plurality of ranges can be set. The output from the AF gate 112 is input into an AF signal processing circuit 113, and is extracted as an AF signal such as a high-frequency component or a luminance difference component (the difference between the maximum and minimum values of the luminance level of the image signal) used for detecting the in-focus point. Normally, when an object is photographed, the extracted AF signal is as shown in FIG. 6. The point at which the AF signal is largest is the in-focus position.

The camera/AF microcomputer 114 is a microcomputer that controls the whole image pickup apparatus. The output from the above-described AF signal processing circuit 113 and the output from a below-described external ranging unit 126 are input into the camera/AF microcomputer 114 and are used for hybrid AF control calculation. According to the calculation result, the camera/AF microcomputer 114 controls the above-described focusing driving source 111 and performs focus control.

To the camera/AF microcomputer 114 are connected a zoom lens position detecting sensor 120 that detects the zoom lens position and a focus lens position detecting sensor 121 that detects the focus lens position. This makes it possible to know where the zoom lens 102 and the focus lens 105 are in their respective movable strokes. For example, in the case where the focus lens 105 is driven with a voice coil motor (VCM), an MR sensor is used as a focus lens position detecting sensor, and the voltage value output from the MR sensor when the focus lens 105 moves is monitored. For example, 2.7 V at infinity to 0 V at the closest distance. From this, the lens position can be known. Alternatively, if the focus lens 105 is driven with a stepping motor, the focus lens position can be known by counting the number of pulses when the focus lens is driven. Similarly, the zoom lens position can be known by monitoring the output from the zoom lens position detecting sensor. The present invention is not limited to these sensors. Any sensor can be used as long as it can detect the lens position. Next, the external ranging unit 126 will be described.

Figure 3:
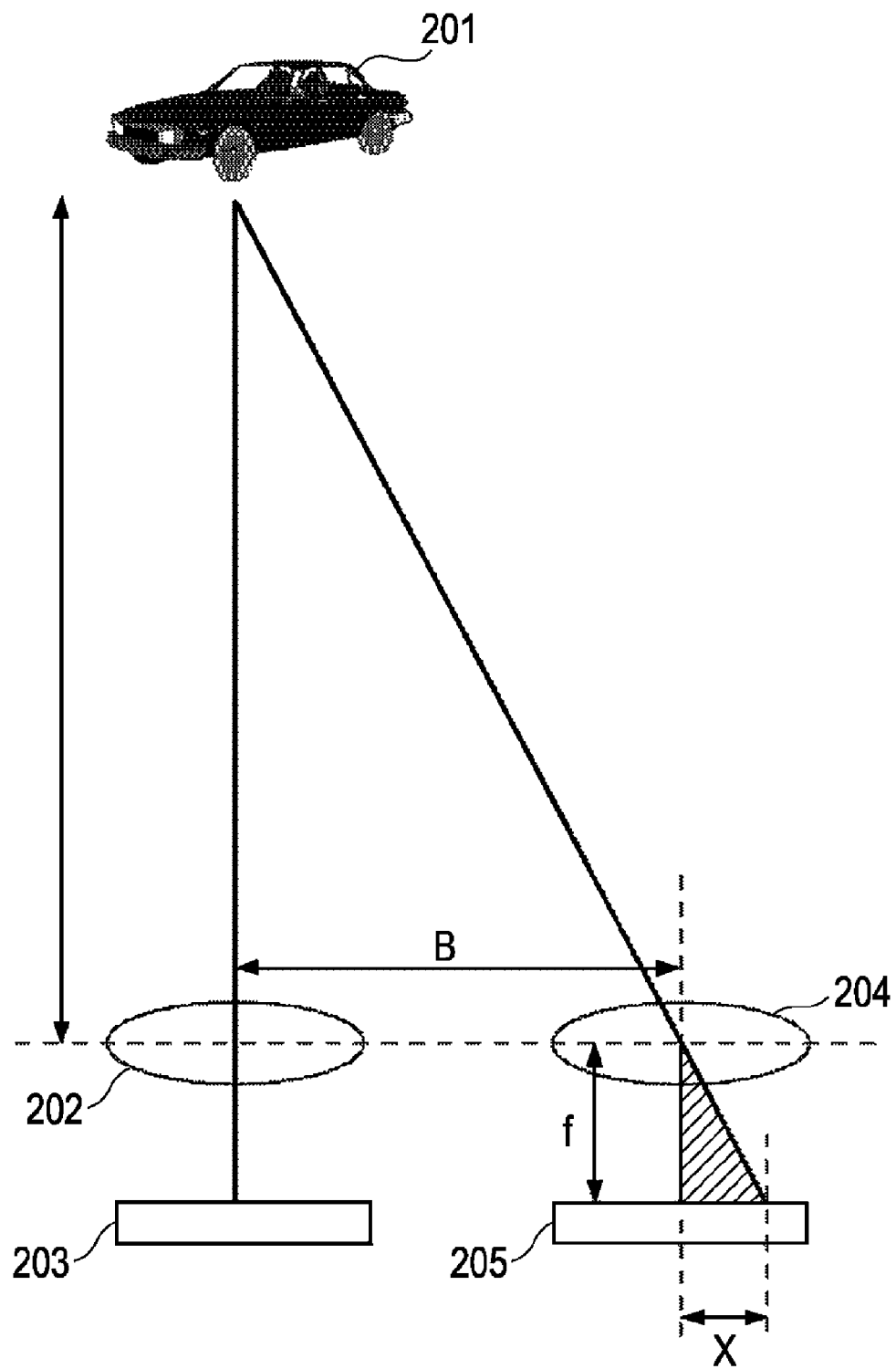
FIG. 3 shows an example structure of a phase difference passive distance sensor.
Figure 4:
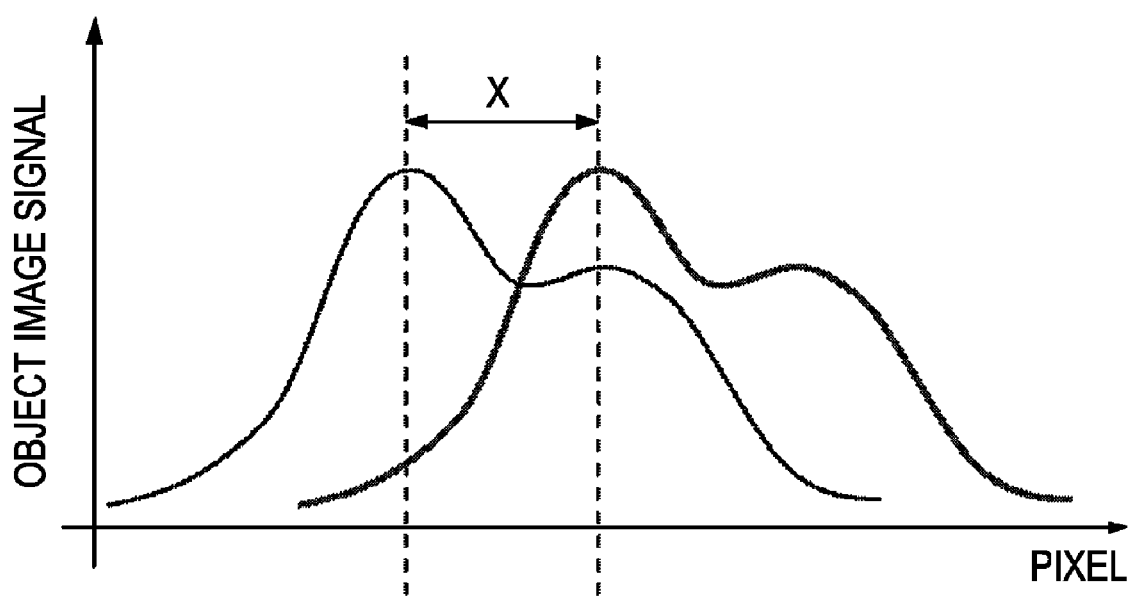
FIG. 4 shows examples of object image signals of the phase difference passive distance sensor.

The external ranging unit 126 is a sensor that measures and outputs information corresponding to the distance to the object by the external measurement method. A plurality of ranging methods are used. FIGS. 3 and 4 show the principle of ranging by one of them, a phase difference passive method. In principle, this external ranging unit 126 can directly measure the in-focus position. Therefore, the focus lens 105 can be moved to the in-focus position at high speed.

In FIG. 3, reference numeral 201 denotes an object, reference numeral 202 denotes an imaging lens in a first light path, reference numeral 203 denotes a photo detector array in the first light path, reference numeral 204 denotes an imaging lens in a second light path, and reference numeral 205 denotes a photo detector array in the second light path. The photo detector arrays in the first and second light paths are disposed away from each other by a base length B. The object light traveling along the first light path forms an image on the photo detector array 203 due to the first imaging lens 202. The object light traveling along the second light path forms an image on the photo detector array 205 due to the second imaging lens 204.

FIG. 4 shows examples of signals of the two object images formed in the first and second light paths read out from the photo detector arrays 203 and 205. Since the two photo detector arrays are apart from each other by the base length B, as can be seen from FIG. 3, the object image signals deviate by a number X of pixels. A calculating unit calculates the correlation between the two signals, shifting the pixel, and obtains the amount of pixel shift at which the correlation is largest, thereby calculating X. From X, the base length B, and the focal length f of the imaging lenses 202 and 204, the distance L to the object is obtained by triangulation using the following formula:

$$L = B \cdot f / X$$

Figure 5:
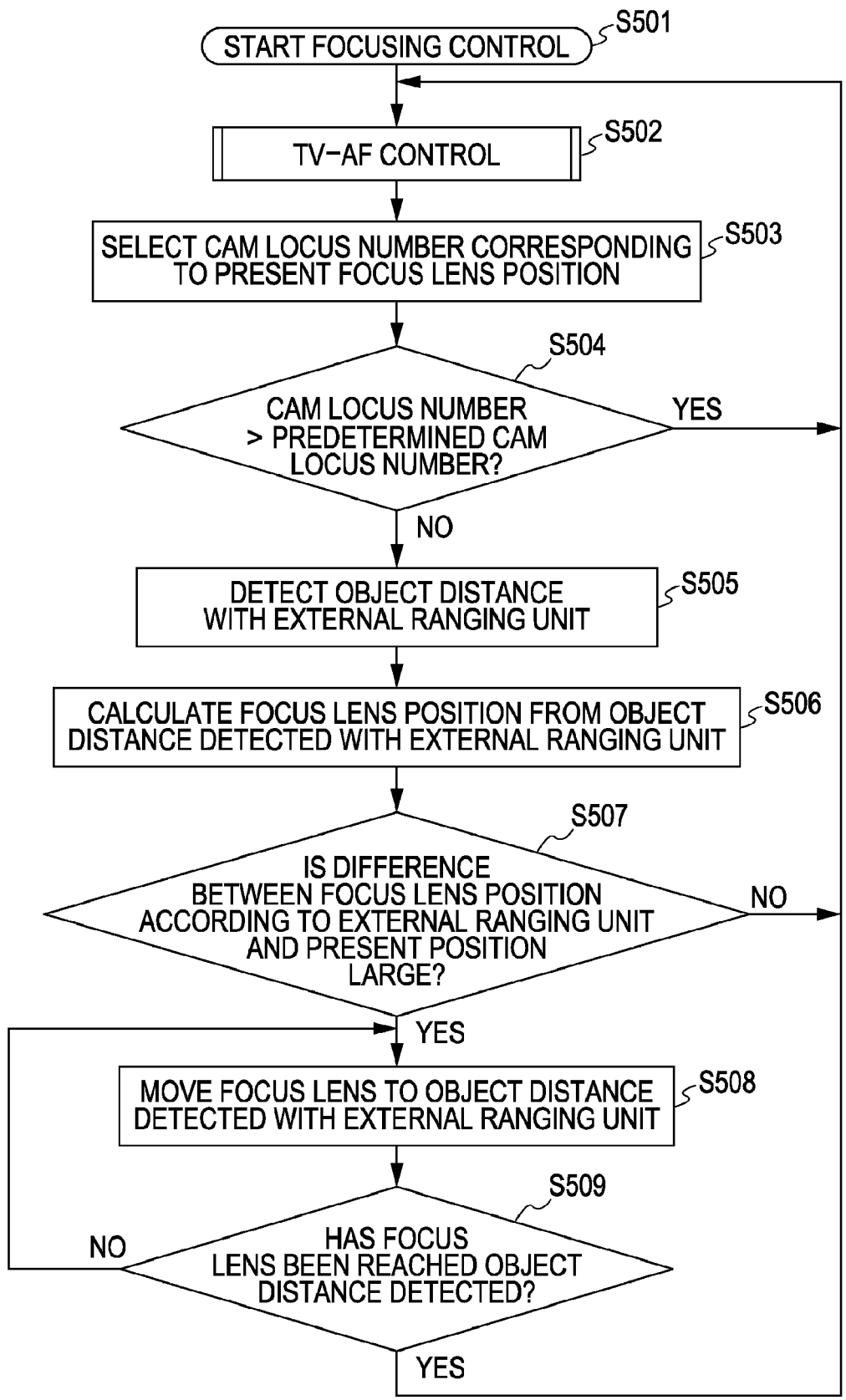
FIG. 5 is a flowchart showing an example hybrid AF control process.

In addition to such a passive ranging method, there are active methods, for example, a method in which the propagation velocity is measured using an ultrasonic sensor, and a triangulation method using an infrared projector, which is commonly used in compact cameras. This embodiment is not limited to these ranging methods and is a method in which the in-focus position is detected with an optical system provided at a position different from the position of the photographing optical system. Next, an example operation of the hybrid AF using the external ranging unit 126 will be described with reference to the flowchart of FIG. 5.

First, the focusing control is started in step S501. In step S502, a TV-AF control is performed. The TV-AF control will hereinafter be described.

In step S503, the cam locus number corresponding to the present focus lens position is selected. This cam locus number 0, 1, 2 . . . N is an index number assigned to the relationship between the zoom lens position and the focus lens position for focusing in each object distance. The curves shown in FIG. 8, which constitute cam locus information stored in the camera/AF microcomputer 114, are numbered in ascending order from bottom (infinite object distance).

In step S503, the index number corresponding to the cam locus on which the zoom lens position and the focus lens position intersect is selected. The zoom lens position and the focus lens position can be monitored by the outputs from the zoom lens position detecting sensor 120 and the focus lens position detecting sensor 121.

In step S504, the cam locus number selected in step S503 is compared with a predetermined cam locus number. The object distance corresponding to this predetermined cam locus number, where the overlap between the light flux of the external ranging unit and the light flux of the photographing optical system is small, leads to misdetection. Such an object distance is, for example, 30 cm. When the object distance is smaller than 30 cm, even if the external ranging unit 126 obtains information on the object distance, the focus lens is not moved based on the information, thereby a malfunction of the AF control being prevented.

If the selected cam locus number is larger than the predetermined cam locus number, the flow returns to step S502, and the TV-AF control is continued. In this case, the cam locus number selected in step S503 corresponds to a cam locus in the range of TV-AF only shown in FIG. 8. The object distance of the object image detected through the photographing optical system is small, and the focus lens position is on the closest distance side. The present focus lens position is on the closest distance side with respect to the predetermined position. In such a state, it is highly possible that the object distance obtained in the external ranging unit 126 is completely different from the object distance of the object image detected through the photographing optical system. Therefore, even if the external ranging unit 126 obtains information on the object distance, the focus lens is not moved based on the information, thereby a malfunction of the AF control being prevented.

If the selected cam locus number is smaller than the predetermined cam locus number, it is highly possible that the object distance in the external ranging unit 126 corresponds to the object distance of the object image detected through the photographing optical system. In this case, the present focus lens position is on the infinity side with respect to the predetermined position. In this case, the flow proceeds to step S505, and information corresponding to the object distance is calculated from the information obtained by the external ranging unit 126, and then the flow proceeds to step S506.

In step S506, from information corresponding to the object distance detected by the external ranging unit 126, the focus lens position for focusing on the object distance is calculated, and then the flow proceeds to step S507. This is a process for calculating the cam locus of the focus lens position for focusing on the object distance according to the detection result in the external ranging unit 126.

In step S507, the focus lens position for focusing on the object distance according to the detection result in the external ranging unit 126 is compared with the present focus lens position. This is for determining whether or not it is appropriate to move the focus lens based on the detection result of the external ranging unit 126.

If the difference between the lens position calculated from the object distance detected by the external ranging unit 126 and the present focus lens position is small, the focal position is not significantly deviated. Therefore, the flow returns to step S502, and the TV-AF control is continued. If the difference is large, it is determined that the focal position is significantly deviated, and the flow proceeds to step S508. In order to focus on the object distance corresponding to the detection result in the external ranging unit 126, the focus lens 105 is moved, and the flow proceeds to step S509.

Figure 7:
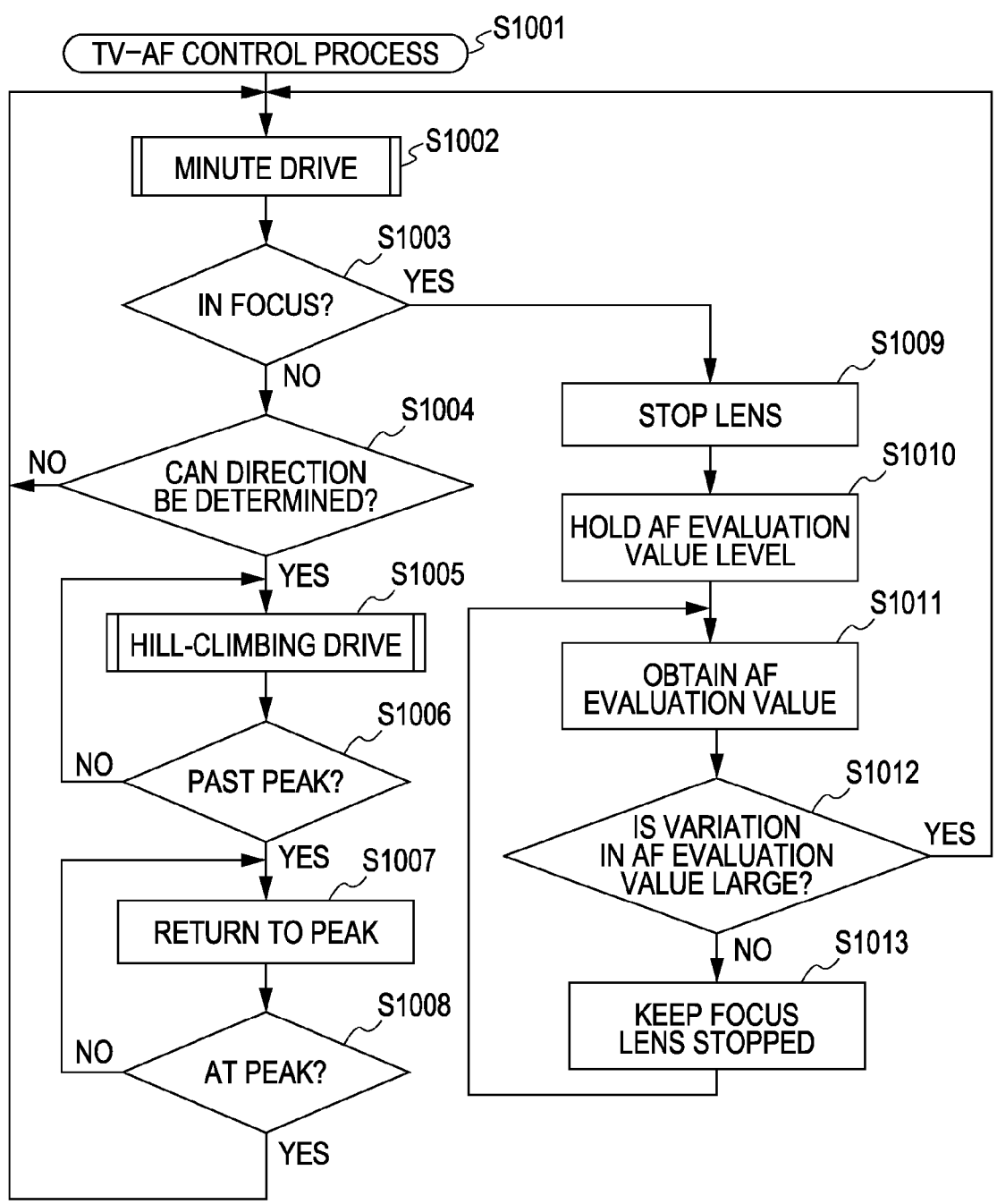
FIG. 7 is a flowchart showing an example TV-AF control process.

In step S509, it is determined whether or not the focus lens 105 has reached the object distance corresponding to the detection result of the external ranging unit 126. If the focus lens 105 has not reached the detected object distance, the flow returns to step S508, and the movement of the focus lens 105 is continued. If the focus lens 105 has reached the object distance corresponding to the detection result of the external ranging unit 126, it is determined that the focus lens 105 has been moved to the vicinity of the in-focus position, and the flow proceeds to step S502. The focus lens 105 is then driven to a more precise in-focus position by the TV-AF control. Next, the operation of the TV-AF method performed in step S502 will be described with reference to the flowchart of FIG. 7.

The AF process is started (step S1001). First, the focus lens 105 is minutely driven (step S1002).

Next, it is determined whether or not an in-focus state is achieved by the minute drive (step S1003). If not, it is determined whether or not the in-focus direction can be determined by the minute drive (step S1004). If not, the flow returns to step S1002. If the in-focus direction can be determined, the focus lens 105 is moved at high speed so that the AF evaluation value increases, by the hill-climbing drive in step S1005.

Next, it is determined whether or not the AF evaluation value is past the peak by the hill-climbing drive (step S1006). If not, the flow returns to step S1005, and the hill-climbing drive is continued. If the AF evaluation value is past the peak, the focus lens 105 is driven in the reverse direction to return to the peak (step S1007).

It is determined whether or not the AF evaluation value is at the peak (step S1008). If not, the flow returns to step S1007, and the operation for returning the AF evaluation value to the peak is continued. If the AF evaluation value is at the peak, the flow returns to step S1002, and the in-focus position of the next moving image is searched by minutely driving the focus lens 105.

If it is determined that an in-focus state is achieved in step S1003, the focus lens 105 is stopped (step S1009), the AF evaluation value in the in-focus state is stored (step S1010), and the flow enters the part of restart determination process.

The AF evaluation value obtained in step S1011 is compared with the previous AF evaluation value stored in step S1010. If there is a difference at a predetermined level or higher, it is determined that a restart is necessary (step S1012).

If it is determined that a restart is necessary, the flow returns to step S1002, and the minute drive is restarted. If it is not determined that a restart is necessary, the focus lens 105 is kept stopped (step S1013). The flow returns to step S1011, and the restart determination process is continued.

As described above, the TV-AF method drives the focus lens 105, repeating the restart determination, the minute drive, the hill-climbing drive, the minute drive, and the restart determination, thereby controlling the AF evaluation value so that the AF evaluation value is always largest.

As described above, when the present focus lens position is on the closest distance side, the TV-AF control is performed without using the detection result of the external ranging unit 126. The present position of the focus lens is determined from the plurality of cam loci stored in the camera/AF microcomputer 114. This makes it possible to prevent a malfunction due to parallax in a hybrid AF control of a TV-AF method through an inner focus photographing optical system and an external measurement method. This is effective in the case where the object image that the image pickup optical system captures is different from the object image that the external sensor captures, for example, in the case of photographing a hand held in front of the image pickup optical system. It is possible to surely focus on the object in the photographing field angle.

In the above description, the present focus lens position is calculated based on the cam locus information. However, the present invention is not limited to this. The present focus lens position may be calculated, for example, from the number of driving pulses of a stepping motor. In this case, it may be determined whether to use the ranging result of the external ranging unit 126, by comparing the number of driving pulses corresponding to the predetermined object distance (30 cm in the above-described example) with the present number of pulses.

Alternatively, in step S504, it may be determined whether or not the present position of the focus lens determined from the stored plurality of cam loci is smaller than the limit value of the external ranging unit 126. For example, when the limit value above which the external ranging unit 126 can measure the amount of deviation between the focal position and the in-focus position is 20 cm, the object distance obtained from the cam locus information may be compared with 20 cm as a threshold. When the object distance is 20 cm or less, since the external ranging unit 126 cannot measure, the output result of the external ranging unit 126 is not used.

Other Exemplary Embodiments

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-232350 filed Aug. 29, 2006, which is hereby incorporated by reference herein in its entirety.

What is claimed is:

1. A focusing apparatus comprising:
   a first detecting unit configured to output an electric signal from an optical image formed through an image pickup optical system including a focus lens and a zoom lens and detect a focus signal showing a sharpness of the optical image from the output electric signal;
   a second detecting unit configured to detect an in-focus position with an optical system provided separately from the image pickup optical system;
   a memory recording information indicating relation of a focus lens position and the zoom lens position corresponding to object distance of an object; and
   a control unit configured to drive and control the focus lens,
   wherein, while driving and controlling the focus lens to bring the object into focus in accordance with a change of a focal length and the object distance, the control unit drives and controls the focus lens using the output from the first detecting unit and an output from the second detecting unit when the positions of the focus lens and the zoom lens are in a first relation, and the control unit drives and controls the focus lens using the output from the first detecting unit without using the output from the second detecting unit when the positions of the focus lens and the zoom lens are in a second relation that a focus of the image pickup optical system is on a closer distance side with respect to a predetermined position compared to the first relation, and
   wherein the control unit determines the in-focus position of the focus lens based on the outputs from the first detecting unit and the second detecting unit when a present position of the focus lens is on an infinity side with respect to the predetermined position.

2. The focusing apparatus according to claim 1, wherein the control unit has information showing a relationship between the zoom lens position and the focus lens position for supporting a plurality of object distances and detects the present position of the focus lens based on the information.

3. The focusing apparatus according to claim 1, wherein the first detecting unit detects the focus signal from a high-frequency component of the electric signal.

4. The focusing apparatus according to claim 1, wherein the second detecting unit detects the in-focus position based on information corresponding to the object distance.

5. The focusing apparatus according to claim 1, wherein a light flux of the optical system of the second detecting unit and a light flux of a photographing lens do not overlap at the predetermined position.

6. The focusing apparatus according to claim 1, wherein the second detecting unit cannot detect at the predetermined position.

7. An image pickup apparatus comprising:
a focusing apparatus including,
a first detecting unit configured to output an electric signal from an optical image formed through an image pickup optical system including a focus lens and a zoom lens and detect a focus signal showing a sharpness of the optical image from the output electric signal;
a second detecting unit configured to detect an in-focus position with an optical system provided separately from the image pickup optical system;
a memory recording information indicating relation of a focus lens position and the zoom lens position corresponding to object distance of an object; and
a control unit configured to drive and control the focus lens, wherein, while driving and controlling the focus lens to bring the object into focus in accordance with a change of a focal length and the object distance, the control unit drives and controls the focus lens using the output from the first detecting unit and an output from the second detecting unit when the positions of the focus lens and the zoom lens are in a first relation, and the control unit drives and controls the focus lens using the output from the first detecting unit without using the output from the second detecting unit when the positions of the focus lens and the zoom lens are in a second relation that a focus of the image pickup optical system is on a closer distance side with respect to a predetermined position compared to the first relation; and
an image pickup unit configured to output an electric signal used in the first detecting unit and output an electric signal used for image recording,
wherein the control unit determines the in-focus position of the focus lens based on the outputs from the first detecting unit and the second detecting unit when a present position of the focus lens is on an infinity side with respect to the predetermined position.

8. A method for controlling a focusing apparatus which includes,
a first detecting unit configured to output an electric signal from an optical image formed through an image pickup optical system including a focus lens and a zoom lens and detect a focus signal showing a sharpness of the optical image from the output electric signal,
a second detecting unit configured to detect an in-focus position with an optical system provided separately from the image pickup optical system,
a memory recording information indicating relation of a focus lens position and a zoom lens position corresponding to object distance of an object, and
a control unit configured to drive and control the focus lens, the method comprising:
driving and controlling the focus lens using the output from the first detecting unit and an output from the second detecting unit when the positions of the focus lens and the zoom lens are in a first relation, and driving and controlling the focus lens using the output from the first detecting unit without using the output from the second detecting unit when the positions of the focus lens and the zoom lens are in a second relation that a focus of the image pickup optical system is on a closer distance side with respect to a predetermined position compared to the first relation, while driving and controlling the focus lens to bring the object into focus in accordance with a change of a focal length and the object distance,
wherein the control unit determines the in-focus position of the focus lens based on the outputs from the first detecting unit and the second detecting unit when a present position of the focus lens is on an infinity side with respect to the predetermined position.

* * * * *